(12) United States Patent
Prokop et al.

(10) Patent No.: US 10,875,078 B2
(45) Date of Patent: Dec. 29, 2020

(54) CORRUGATED FIN ELEMENT

(71) Applicant: DBK DAVID + BAADER GMBH, Rülzheim (DE)

(72) Inventors: Jürgen Prokop, Landau (DE); Wolfgang Werling, Hatzenbühl (DE); Didier Lehmann, Leutenheim (FR); Rupert Jäger, Wörth-Büchelberg (DE)

(73) Assignee: DBK DAVID + BAADER GMBH, Rülzheim (DE)

( * ) Notice: Subject to any disclaimer, the term of this patent is extended or adjusted under 35 U.S.C. 154(b) by 159 days.

(21) Appl. No.: 15/744,179

(22) PCT Filed: Jul. 8, 2016

(86) PCT No.: PCT/EP2016/066345
§ 371 (c)(1),
(2) Date: Jan. 12, 2018

(87) PCT Pub. No.: WO2017/009254
PCT Pub. Date: Jan. 19, 2017

(65) Prior Publication Data
US 2018/0200779 A1    Jul. 19, 2018

(30) Foreign Application Priority Data

Jul. 16, 2015   (DE) ........................ 10 2015 111 571

(51) Int. Cl.
*B21D 53/02*   (2006.01)
*F24H 3/04*    (2006.01)
(Continued)

(52) U.S. Cl.
CPC .......... *B21D 53/025* (2013.01); *B21D 13/10* (2013.01); *B21D 53/02* (2013.01); *B21D 53/022* (2013.01);
(Continued)

(58) Field of Classification Search
CPC .... B21D 53/025; B21D 53/022; B21D 53/02; B21D 53/04; B21D 13/10; F24H 3/0435;
(Continued)

(56) References Cited

U.S. PATENT DOCUMENTS 2,035,403 A * 3/1936 Przyborowski ......... F28F 1/126
165/165
3,673,846 A * 7/1972 Levington et al. .... B21D 53/04
72/326

(Continued)

FOREIGN PATENT DOCUMENTS

CH       358 773 A     12/1961
DE    102 10 579 A1    10/2002
(Continued)

OTHER PUBLICATIONS

German Patent and Trademark Office Search Report for German Application No. DE 10 2015 111 571.9 dated Jun. 20, 2016 (English translation; 12 pages).
(Continued)

*Primary Examiner* — Jermie E Cozart
(74) *Attorney, Agent, or Firm* — Mindful IP PLLC; Michael McCandlish

(57) ABSTRACT

The invention relates to a method for producing a corrugated fin element for a heating register or for another heating device, through which corrugated fin element a flow can pass, to a corrugated fin element produced according to such a method, and to a heating register designed with such corrugated fin elements, wherein the corrugated fin elements are produced by unfolding.

4 Claims, 5 Drawing Sheets

Figure 1:
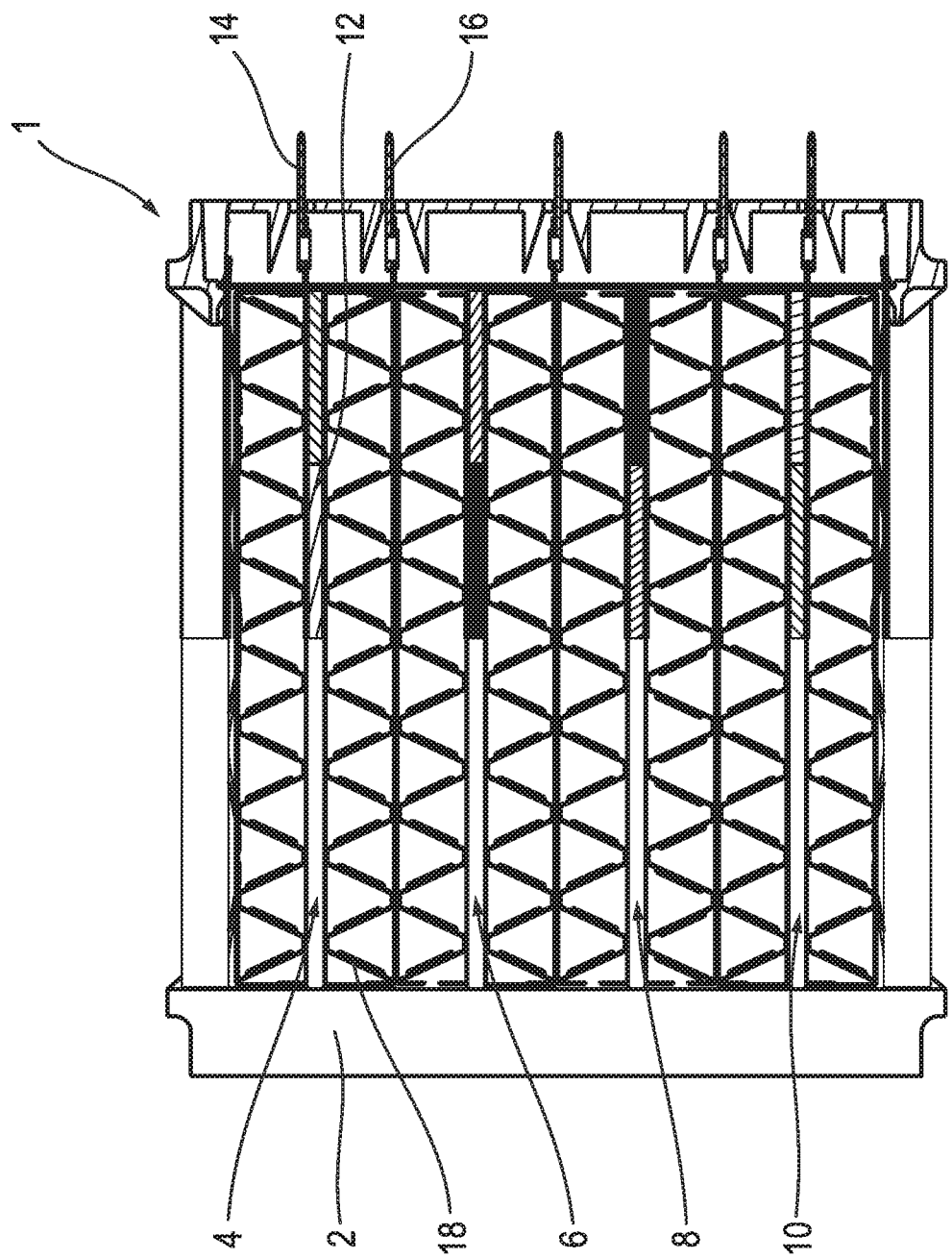

(51) Int. Cl.
*F28F 1/12* (2006.01)
*B21D 13/10* (2006.01)
*B21D 53/04* (2006.01)
*F24H 9/18* (2006.01)
*H05B 3/50* (2006.01)
*B60H 1/22* (2006.01)

(52) U.S. Cl.
CPC .......... *B21D 53/04* (2013.01); *F24H 3/0429* (2013.01); *F24H 3/0435* (2013.01); *F24H 9/1872* (2013.01); *F28F 1/126* (2013.01); *F28F 1/128* (2013.01); *H05B 3/50* (2013.01); *B60H 2001/2271* (2013.01); *F28F 2215/00* (2013.01); *F28F 2215/08* (2013.01); *H05B 2203/02* (2013.01); *H05B 2203/023* (2013.01); *Y10T 29/49378* (2015.01); *Y10T 29/49385* (2015.01)

(58) Field of Classification Search
CPC ........ F28F 1/128; F28F 1/126; F28F 2215/00; Y10T 29/49385; Y10T 29/49378
See application file for complete search history.

(56) References Cited

U.S. PATENT DOCUMENTS

| | | | |
|---|---|---|---|
| 2005/0167088 A1* | 8/2005 | Paulman | F28F 1/126 165/152 |
| 2007/0215286 A1 | 9/2007 | Kaneda | |
| 2008/0047696 A1* | 2/2008 | Sperandei | F28F 1/128 165/109.1 |
| 2013/0075071 A1* | 3/2013 | Yabe et al. | F28F 1/128 165/183 |

FOREIGN PATENT DOCUMENTS

| | | | | |
|---|---|---|---|---|
| DE | 10 2009 059 283 A1 | 6/2011 | | |
| DE | 10 2012 205 916 A1 | 10/2013 | | |
| DE | 10 2012 106 157 A1 | 1/2014 | | |
| DE | 10 2013 108357 A1 | 2/2015 | | |
| EP | 0 350 528 B1 | 4/1992 | | |
| EP | 1 327 834 B1 | 10/2004 | | |
| EP | 2 022 293 A1 | 2/2009 | | |
| EP | 2832464 A1 | 2/2015 | | |
| GB | 1 535 781 A | 12/1978 | | |
| JP | 60221133 A | * | 11/1985 | ............ B21D 13/04 |
| JP | 01034521 A | * | 2/1989 | |
| JP | 2014176885 A | * | 9/2014 | |
| WO | WO-2005080018 A1 | * | 9/2005 | ............ B21D 13/04 |

OTHER PUBLICATIONS

International Search Report and Written Opinion dated Oct. 20, 2016 for PCT/EP2016/066345 (11 pages; with English translation).
International Preliminary Report on Patentability Written Opinion for PCT/EP2016/066345 dated Oct. 20, 2016 (7 pages).

* cited by examiner

CORRUGATED FIN ELEMENT

CROSS-REFERENCE TO RELATED APPLICATIONS

This application is a national stage of, and claims priority to, Patent Cooperation Treaty Application No. PCT/EP2016/066345, filed on Jul. 8, 2016, which application claims priority to German Application No. DE 10 2015 111 571.9, filed on Jul. 16, 2015, which applications are hereby incorporated herein by reference in their entireties.

DESCRIPTION

The disclosure relates to a method for producing a corrugated fin element for a heating register or for another heating device, through which corrugated fin element a flow can pass to a corrugated fin element produced according to such a method, and to a heating register or the like comprising a plurality of such corrugated fins.

For the use in motor vehicles, especially with consumption-optimized internal combustion engines, electrical heating devices for heating airflows are frequently used. Such heating devices are usable for high voltage and low voltage applications in automotive engineering, but also in industrial engineering, for instance, in the case of control cabinet heating, auxiliary heating for low-energy houses, etc.

The basic structure of such heating devices is, for instance, disclosed in EP 0 350 528 B1 of the applicant. Accordingly, the heating device has several heating stages which are controllable depending on the heating power to be triggered, and which consist essentially of two radiator elements having heating elements, preferably PTC (positive temperature coefficient) heating elements disposed in between. These radiator elements are designed as corrugated fins which are bent in a meandering pattern from a metal strip, wherein the individual corrugated fins are in mutual contact with each other in the regions adjoining their legs.

EP 2 022 293 B1 illustrates corrugated fin elements in which the corrugated fins are soldered to one another for increasing the stiffness.

From EP 1 327 834 B1 it is known to crimp the corrugated fin elements with contact sheets disposed at the apexes of the corrugated fins, for stiffening the corrugated fin elements such that the handling of the per se flexible corrugated fin elements is distinctly improved.

In DE 10 2013 108 357 A1 corrugated fin elements are described in which, for increasing the stiffness, the apexes of the corrugated fins are impacted with a pressing force transversely to the longitudinal extension of the corrugated fin element, so that these apexes are "flattened". Additionally, swages may be formed in the legs of the corrugated fins which join the apexes.

Pursuant to EP 2 022 293 B1 another possibility consists in soldering a contact sheet or the like with the apexes of the corrugated fins. Alternatively, it is also known to connect the corrugated fins with the contact sheet by gluing.

In these examples the apexes of the corrugated fins are either in lateral contact with each other or are arranged at a very small distance to each other. These small distances between the corrugated fins of a corrugated fin element, however, lead to an increased loss of pressure during through-flow and to a resulting reduction of the flow rate of the air and to increased noise generation of the heating.

In principle, the loss of pressure can be reduced in that the apexes are spaced apart from each other. Such corrugated fin elements with widely spaced corrugated fins have, however, the disadvantage that, after bending, they are even more flexible than the elements with a small apex distance and that, furthermore, due to the distinctly increased length the space requirement is great when the crude metal strip is bent in a meandering pattern. Likewise, it is possible to reduce the loss of pressure by forming zones which are flown through without corrugated fin elements. Such solutions with a bypass have, however, the disadvantage that the distribution of air is no longer homogeneous.

As compared with this it is an object of the disclosure to provide a method which facilitates the production of a corrugated fin element which can be flown through with little loss of pressure. The further object underlying the disclosure is to provide a corrugated fin element with reduced flow-through cross-section, and a heating register designed with at least one corrugated fin element of this kind.

This object is solved with respect to example methods, with respect to example corrugated fin elements, and with respect to example heating registers according to this disclosure.

Other advantageous further developments of the invention are the subject matter of the sub-claims.

In accordance with the disclosure, for producing a corrugated fin element first of all a corrugated fin basic element is produced which has basically a conventional structure, so that the apexes of the individual corrugated fins either are in contact with each other or are arranged at a small distance to each other. A corrugated fin basic element of this kind basically does not differ from the initially described conventional corrugated fin elements. The corrugated fin basic element can also be referred to herein as a base element.

Following the production of this basic element, its end sections are then impacted with a tensile force in the longitudinal direction of the corrugated fin element, so that a widening of the corrugated fin element takes place such that the distance between the apexes is increased by plastic deformation (bending up) and the total length of the corrugated fin element thus increases correspondingly. The resulting shallower positioning of the corrugated fins results in a distinct reduction of the flow resistance during flow-through, on the one hand. On the other hand, it turned out surprisingly that a very uniform, reproducible wave structure can be formed by the bending up of the basic elements.

Accordingly, the flow-through resistance is reduced with little manufacturing effort by a corrugated fin element produced in accordance with such a method.

A heating register designed with a corrugated fin element of this kind is, with a simple construction, superior to conventional solutions due to the optimized flow rate and the reduced noise generation.

The stability of the corrugated fin elements and the heat exchange transversely to the flow-through direction can be improved by the forming of swages.

In a variant of an embodiment of this kind, a plurality of swages is disposed side by side.

In one example, the widening takes place such that, after the deformation, the distance between the apexes comprises a multiple of the apex width, preferably of the apex width of the basic element.

The stability of the corrugated fin element can be further improved if the corrugated fin element or the basic element is impacted with a pressing force before or after unfolding. This pressing force is chosen such that the apexes (basic element or corrugated fin element) are plastically flattened or "leveled".

This "leveling" may thus take place after the forming of the basic element or after the unfolding. Basically, this leveling may also be renounced.

Figure 2:
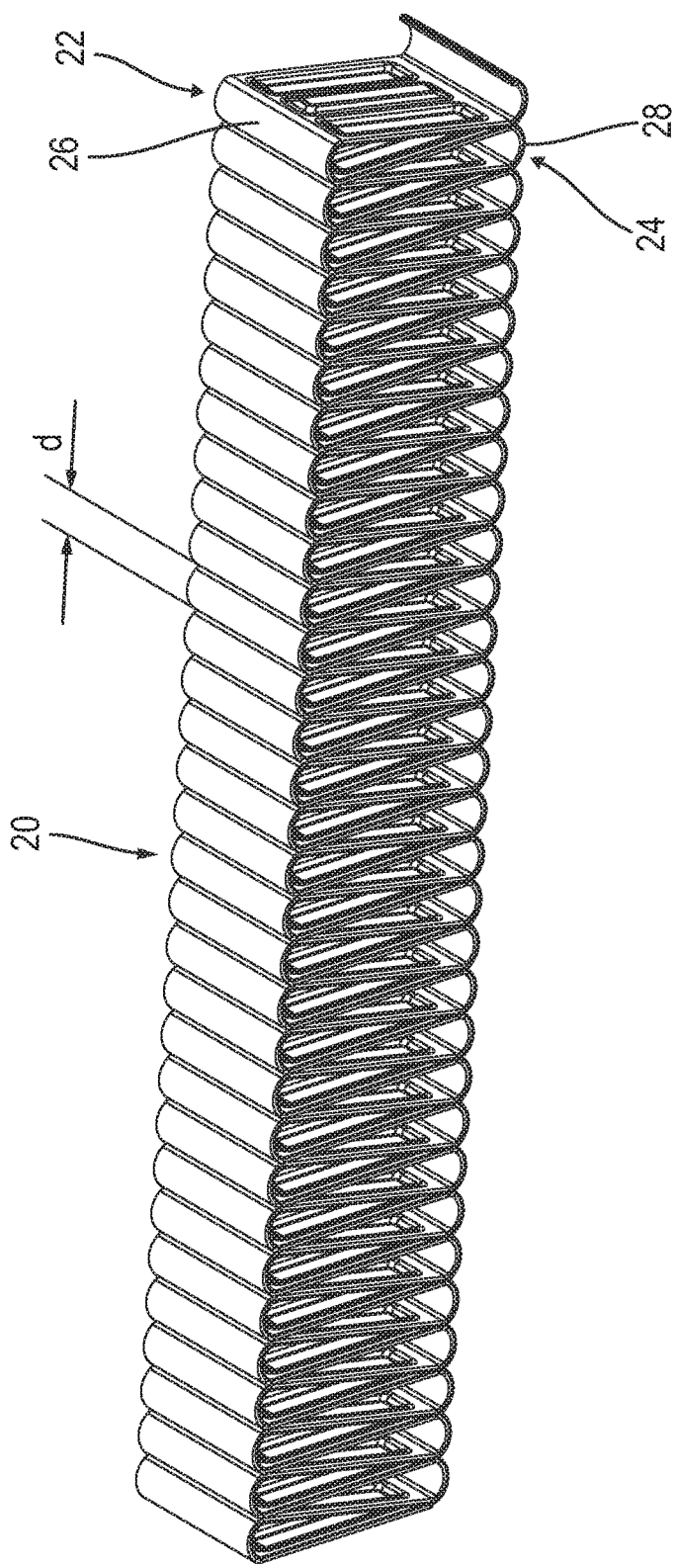
Figure 3:
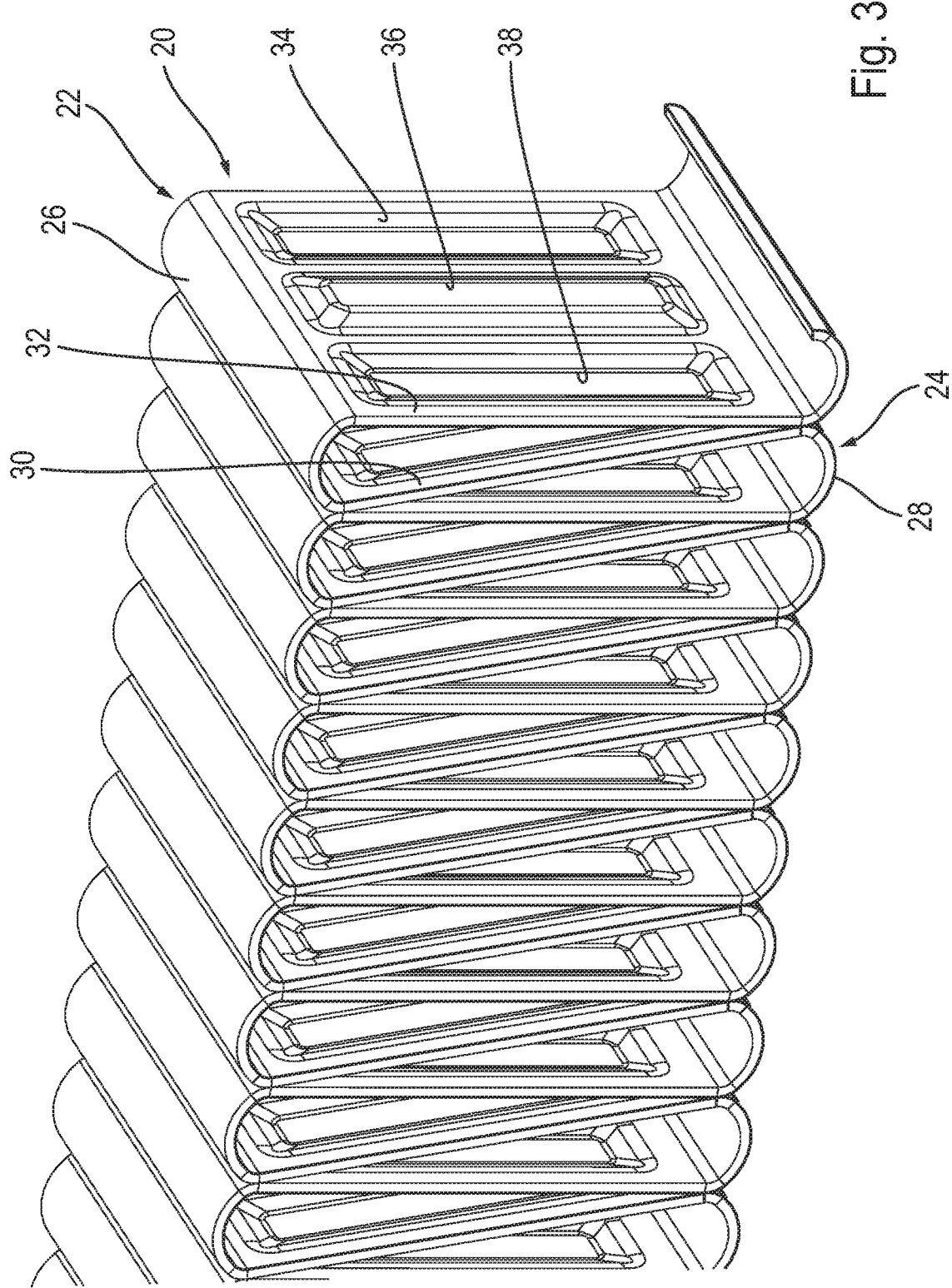
Figure 4:
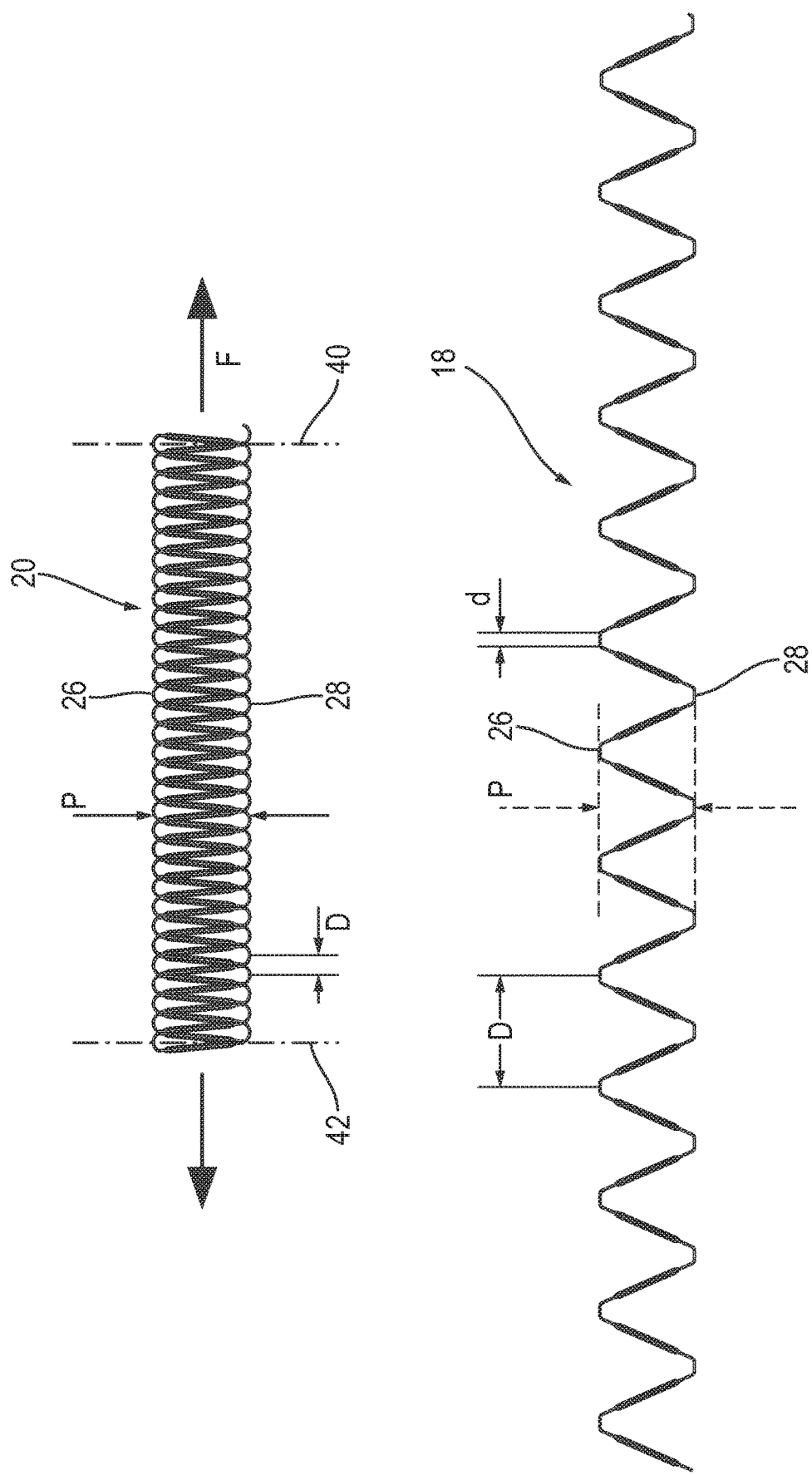
Figure 5:
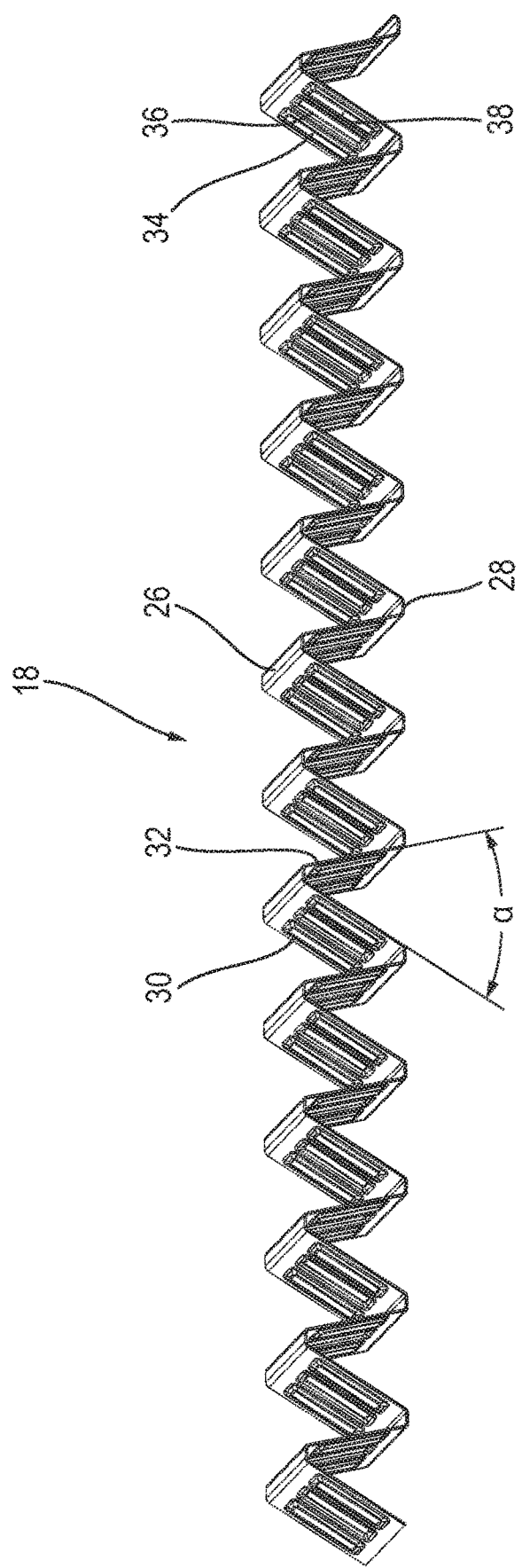

A preferred example will be explained in detail in the following by means of schematic drawings. There show:

FIG. 1 a schematic diagram of a heating register with a plurality of corrugated fin elements;

FIG. 2 a three-dimensional illustration of a corrugated fin basic element for the production of a corrugated fin element pursuant to FIG. 1;

FIG. 3 an enlarged partial representation of the basic element of FIG. 1;

FIG. 4 an illustration for explaining the method for producing a corrugated fin element in accordance with the disclosure; and FIG. 5 a corrugated fin element produced in accordance with such a method for a heating register pursuant to FIG. 1.

FIG. 1 shows a side view of a heating register 1 as it is, for instance, used for heating an airflow. This heating register 1 has a frame 2 in which four heating elements 4, 6, 8, 10 are inserted. Each heating element has, for instance, PTC resistance elements 12 which are each controllable via electric contacts 14, 16 (current supply, mass). The actual electrical contacting may, for instance, take place via contact sheets which are in operative electrical connection with the PTC components. Like in the illustrated embodiment, the electrical contacting may take place via the contact sheets and via corrugated fins.

It is to be understood that, instead of the PTC resistance elements 12, also heating elements of different construction may be used.

Pursuant to the illustration in FIG. 1, each heating element has two corrugated fin elements 18 which are arranged at both sides of the PTC resistance elements 12 and which are in thermal (and also electrical) contact with the PTC resistance elements 12 and transfer the heat given off by them to the air flowing through the heating register 1 perpendicularly to the drawing plane. The construction of heating registers 1 of this kind is known, so that further explanations are dispensable.

FIG. 2 shows a corrugated fin basic element 20 from which the corrugated fin elements 18 incorporated in the heating register 1 are formed. Such a basic element 20 corresponds substantially to the corrugated fin elements as they are disclosed in the initially mentioned state of the art pursuant to DE 10 2013 108 357 A1. Accordingly, such a basic element 20 has a plurality of corrugated fins 22, 24 bent from a metal strip in a meandering pattern, the apexes 26, 28 of which corrugated fins are, in the illustration pursuant to FIG. 2, in flush contact or else are arranged at a comparatively small distance to each other, which is distinctly smaller than the breadth d of an apex.

As may be taken from the enlarged detailed illustration pursuant to FIG. 3, each apex 26, 28 turns into lamella legs 30, 32 which are positioned in a V-shape with respect to each other, wherein this V closes away from the associated apex 26 to the other apex 28. In each lamella leg 30, 32 swages are formed, in the illustrated embodiment three swages 34, 36, 38 positioned side by side, which are formed by stamping and bending during the production of the basic element 20. The two outer swages 34, 38 are shaped inwardly, toward the opposite lamella leg 30, while the middle swage 36 is shaped to the right, toward the adjacent corrugated fin. It is to be understood that another swage geometry or a different number of swages may also be used. Due to these swages the corrugated fin 22, 24 is stiffened distinctly as compared to swage-free corrugated fins, so that the transportation of the deformed basic elements 20 from the bending tool to the following processing step is improved due to the increased stiffness.

With respect to further details, reference is made to DE 10 2013 108 357 A1 for reasons of simplification.

The basic element 20 formed this way with alternatingly contacting corrugated fins 22, 24 is then—as illustrated in FIG. 4—processed in a further production step to the corrugated fin element 18, as it is incorporated in the heating register 1. In this process, preferably—like in DE 10 2013 108 357 A1—the rounded apexes 26, 28 are impacted with a pressing force P (see FIG. 4 top). This pressing force P acts transversely to the longitudinal extension of the basic element 20. By this pressing force P it is achieved that the originally rounded apexes 26, 28 are flattened (leveled), as illustrated in FIG. 4 at the bottom. This leveling may, for instance, take place by a pressing tool impacting a plurality of apexes 26, 28 simultaneously with the pressing force P.

Following this flattening, the basic element 20 is impacted with a tensile force F pursuant to the illustration in FIG. 4 at the top. For this purpose, elements transferring the tensile force engage the basic element 20 at holding regions 40, 42 which are indicated in dots and dashes, so as to pull the basic element 20 apart, as illustrated in FIG. 4, so that the corrugated fin angle which is "negative" in the basic condition is widened such that the corrugated fin angle between the lamella leg 30, 32 is quasi inverted. The result of this is that the lamella legs 30 spread, for instance, from the top apex 26 to the next apex 28 positioned there beneath. This widening resulting from a plastic deformation of the basic element 20 leads to it that the total length is distinctly increased as compared to the total length of the basic element 20. In the illustrated example the distance D between two adjacent apexes is, for instance, a multiple, for example more than the 5-fold, of the breadth d of an apex. In the basic element 20 the distance D is almost zero since the corrugated fins 22, 24 are in contact with each other along their apexes 26, 28.

It has turned out surprisingly that the method according to the disclosure, i.e. first of all producing a basic element 20 with an almost conventional structure and then widening this basic element 20, provides a corrugated fin element 18 which can be produced with high precision with a predetermined apex distance D. A corrugated fin element 18 of this kind stands out by a comparatively great stiffness while being very easy to produce.

It has further turned out that the leveling eliminates the risk of drawing in, in which, for instance, the upper apex 26 arranged in FIG. 4 between two lower apexes 28 is "drawn in" and curves inward toward the two other apexes 28.

The method in accordance with the disclosure may be performed with basic elements cut into lengths, but also with a basic element strand formed as an "endless tape", in which case cutting into lengths will then take place in a further processing step.

In deviation from the above-described proceeding it is also possible, as indicated in dashes in FIG. 4 at the bottom, to apply the pressing force P for flattening (leveling) the apexes 26, 28 in a process step following the unfolding by the force F.

By means of the leveling it is, apart from the stiffening, also achieved that a good contact face for adjoining elements, such as PTC resistance elements 12 or contact sheets, is provided.

Alternatively it is also possible to completely omit the process step of leveling.

FIG. 5 shows a three-dimensional illustration of the corrugated fin element 18 produced by the unfolding of a basic element. In this illustration one recognizes the apexes 26, 28 flattened by leveling and the lamella legs 30, 32 positioned at a comparatively large V-angle α. This angle is, for instance, more than 30°. In the concrete example it is approximately 40°.

The disclosure relates to a method for producing a corrugated fin element for a heating register or for another heating device, through which corrugated fin element a flow can pass, to a corrugated fin element produced according to such a method, and to a heating register designed with such corrugated fin elements, wherein the corrugated fin elements are produced by unfolding.

LIST OF REFERENCE NUMBERS 1 heating register
2 frame
4 heating element
6 heating element
8 heating element
10 heating element
12 PTC resistance element
14 contact
16 contact
18 corrugated fin element
20 corrugated fin basic element (can also be called "base element")
22 corrugated fin
24 corrugated fin
26 apex
28 apex
30 lamella leg
32 lamella leg
34 swage
36 swage
38 swage
40 holding region
42 holding region

The invention claimed is:

1. A method for producing a corrugated fin element, wherein the corrugated fin element comprises a plurality of corrugated fins of wave-shaped design, the method comprising:
    producing a base element having apexes of the plurality of corrugated fins that are in contact with adjacent apexes or are arranged at a distance to the adjacent apexes substantially smaller than a breadth of one of the apexes,
    impacting the base element with a tensile force so as to pull the base element apart such that a distance between the adjacent apexes is increased by deformation and a total length of the corrugated fin element increases relative to the base element, wherein in the base element, swages are formed in lamella legs joining the apexes; and
    after impacting the base element with the tensile force, impacting the apexes with a pressing force transversely to a longitudinal extension of one of (1) the base element or (2) the corrugated fin element.

2. The method according to claim 1, wherein a distance between the adjacent apexes after deformation is a multiple of the breadth of the one of the apexes.

3. The method according to claim 2, wherein the distance between the adjacent apexes after deformation is at least 5-fold of the breadth of the one of the apexes.

4. The method according to claim 1, wherein the pressing force is chosen such that the apexes are flattened or leveled.

* * * * *